May 9, 1933.  C. MARX  1,907,649
PROCESS OF QUICK FREEZING
Filed June 4, 1930  3 Sheets-Sheet 3
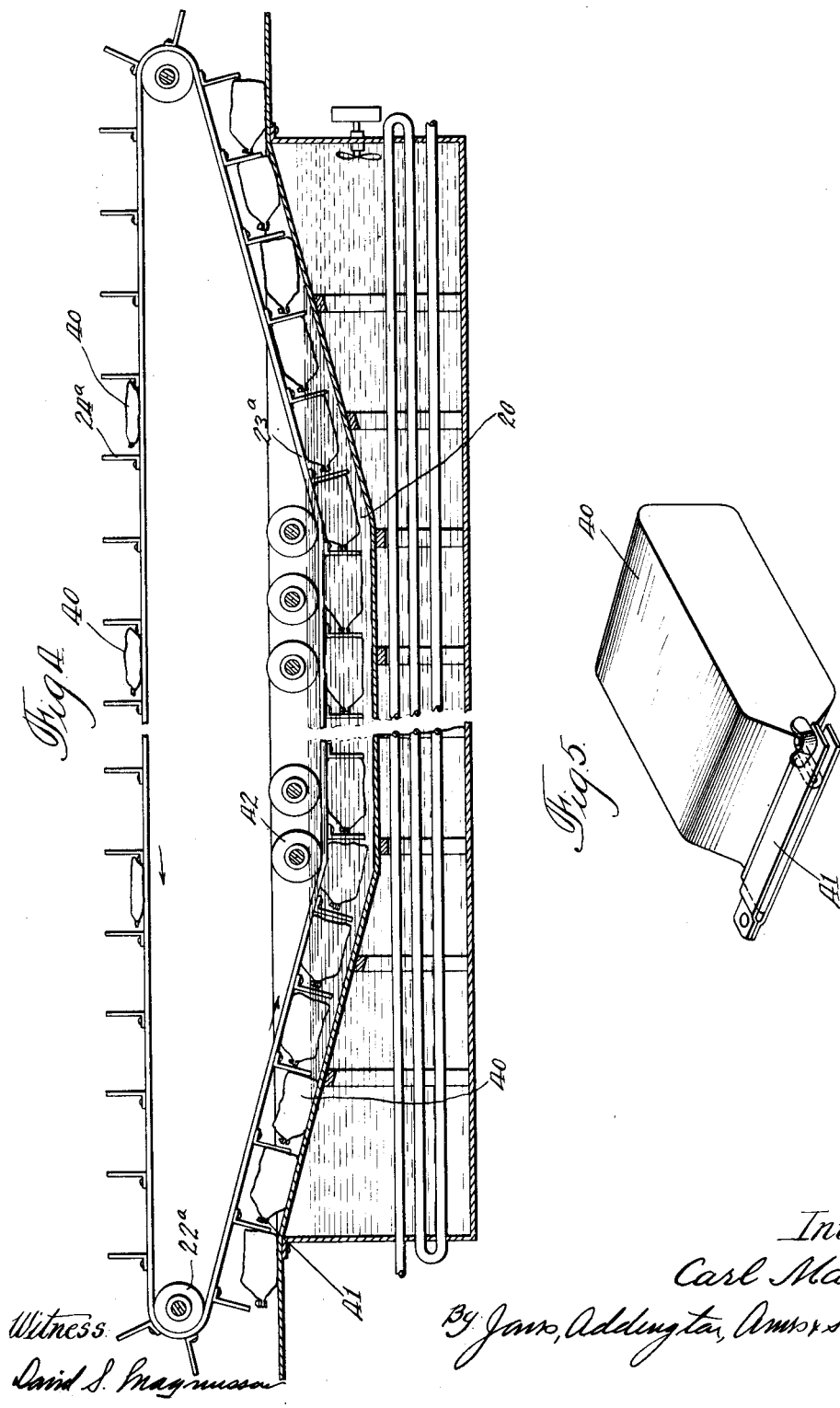

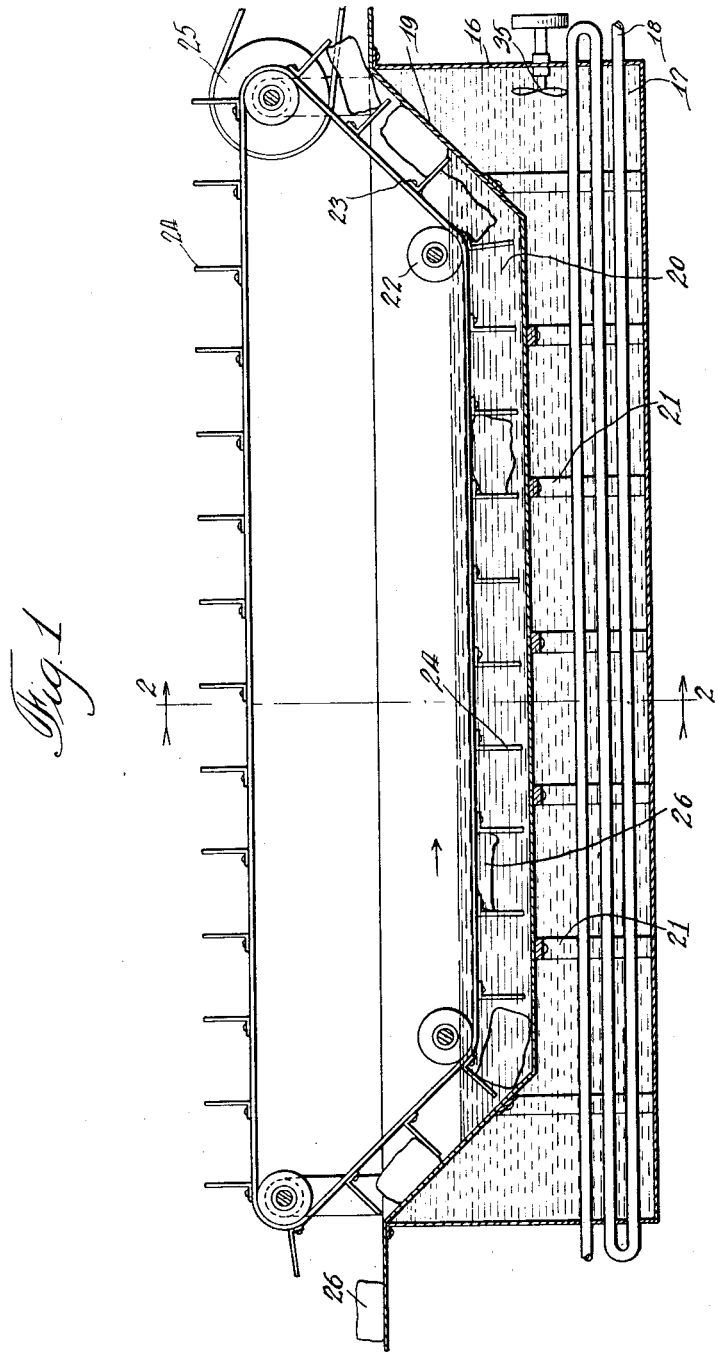

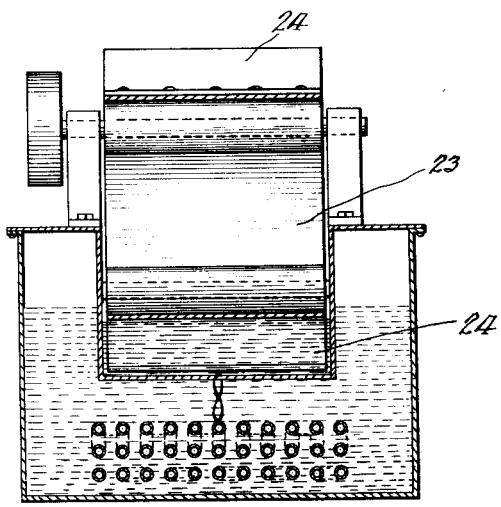
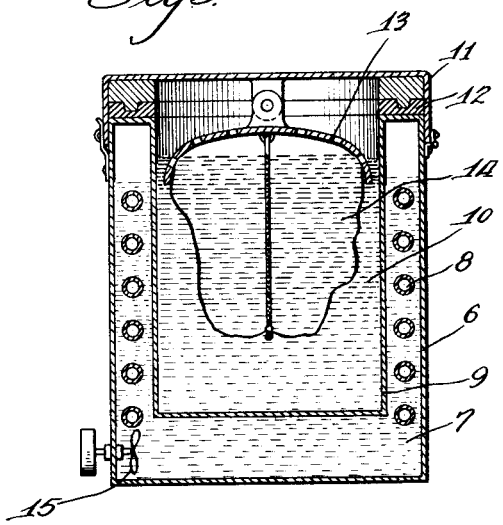

Patented May 9, 1933

1,907,649

UNITED STATES PATENT OFFICE

CARL MARX, OF CHICAGO, ILLINOIS, ASSIGNOR TO PAUL W. PETERSEN, OF CHICAGO, ILLINOIS

PROCESS OF QUICK-FREEZING

Application filed June 4, 1930. Serial No. 459,130.

The present invention relates to an improved process for freezing comestibles such as meats, fish, fruits, vegetables, etc. in an efficient and economical manner.

One of the objects of the present invention is to freeze comestibles by indirect contact with a cold nonaqueous cooling fluid having the property of not wetting the articles that are to be frozen.

Another object of the invention is to freeze comestibles very quickly, so that fine or small ice-crystals rather than large ice-crystals will form therein, and to carry out said freezing operation by contacting as much as possible the surface of the articles with an excellent conductor of heat that is kept at a low temperature and which has the property of remaining fluid at the said low temperature and which does not wet the articles.

Another object of the invention is to provide means for immersing comestibles in suitable packages or containers in a non-aqueous freezing medium at a low temperature, said medium being a better conductor of heat than water or brine.

A further object of the invention is to provide means for transporting the articles to be frozen through a non-aqueous freezing bath in which the articles are subjected to intense cold by substantial contact with the heat-transmitting non-aqueous fluid.

A further object of the invention is to quick-freeze comestibles by immersion in cold liquid metals such as mercury.

Other objects of the invention will appear from the specification and drawings which form a part thereof.

Stated in its broadest aspects, the present invention concerns a method of freezing comestibles, such as fish, meat, vegetables, fruits and the like, by immersion in very cold mercury while enveloped with a sheathing or package that will not be permeable to the mercury, so that there will be no danger from mercury becoming a parts of the edible product that results from the freezing of the comestible. The invention also comprises means for bringing about the contact of the comestibles, or their immersion in the mercury bath, either as a batch process, or continuously in suitable machinery for conveying the comestibles through the freezing zone.

In the drawings that form a part of the present application, various modifications of devices for carrying out my invention are shown. In the said drawings:

Figure 1 is a longitudinal section of a continuous freezing machine employing mercury as the heat-transmitting fluid;

Fig. 2 is a cross sectional view of the machine of Fig. 1 taken along the line 2—2 of Fig. 1;

Fig. 3 is a modification of the invention in which is shown a cross-sectional view of a tank containing mercury and provided with means for plunging the comestible to be frozen into the same and to hold it substantially under the surface of the mercury long enough to insure that it is frozen;

Fig. 4 is a longitudinal section of a modified form of the machine shown in Fig. 1, and Figure 5 is a perspective view of a container suitable for housing the comestibles while undergoing the freezing process.

Before describing the details of the present invention a short discussion of the art of freezing is appended so that the relation of the present invention to the prior art may be understood more readily. Ordinarily, when comestibles containing moisture (water or juices) are subjected to temperatures below the freezing point of water (32 degrees Fahrenheit), they will gradually become frozen; the speed of freezing depending upon a number of variable factors. The temperature of the freezing medium, be it air, brine or contact with cold surfaces, is one factor; the amount of area exposed to the freezing medium is another; and the composition of the juices in the comestible is still another. When comestibles are frozen slowly, and subsequently thawed for use, it will be found that many of the cells of the product have been seriously injured, and the products will have lost the characteristic appearance of the fresh products, and will also differ in their taste. When, however, the comestibles have been frozen rapidly, or, as it has become customary in the refrigeration art to call them "quick-frozen", the products on thawing will be found to possess practically all of the initial characteristics of the fresh materials. This is of great importance, and a very large industry in quick-frozen products has been built up in this country.

A number of practical processes of quick-freezing have been described in the past, all being based on the fundamental idea of abstracting the heat from the material to be frozen as rapidly as possible. The greater the rate of heat transfer, the greater the freezing speed. The temperatures employed in quick-freezing have been on the order of from 20 to 50 degrees below zero (Fahrenheit). In some of the processes the materials are placed in cans or similar containers which are then immersed directly in cold brine (calcium chloride brine is the one most commonly used) wherein the products become chilled and frozen rapidly. It is then the usual procedure slightly to warm the outside of the cans to enable the ready discharge of the frozen products from the cans.

Another process involves the floating of metallic flat pans through a tunnel on slowly moving cold brine, the heat being of course thus abstracted only from one side of the comestible that is being frozen. Another process attempts to speed up the freezing of the products by floating them in pans as just described, but in addition submerging the cans by covering them with a loosely fitting cover so arranged that it will entrap the air over the pan, so that the pan and its contents will be kept free from the brine, the whole assembly being plunged into the cold brine after the fashion of a diving-bell.

In still another process, the materials to be frozen are first placed in compact packages which are then sealed into the form in which they are to be sold to the consumer. The packages are then allowed to pass between two highly chilled metallic belts, there being an upper and a lower belt in close contact with the packages, thus removing the heat therefrom and freezing their contents. The belts themselves are kept at the required low temperature by spraying very cold brine, at about −50° F., against the opposite sides thereof.

In still another process the articles to be frozen, such for example as fish fillets, are placed on metallic plates that are thoroughly cooled by immersion in or spraying with cold brine. In this case also, however, the heat is abstracted from the materials from but one side.

A few processes have been proposed for obtaining more complete contact of the comestibles with the freezing liquid. Fish have, for example, been frozen by direct immersion in unsaturated sodium chloride brine, followed by immersion in pure water to glaze the frozen products. There are, however, many objections to the direct immersion of the comestibles in the cold brine as this increases their salt content, if sodium chloride is used as the solute in the brine, or introduces calcium chloride if the latter is used for the brine.

The present invention is aimed at overcoming the difficulties of the prior art, particularly the difficulty in devising means for increasing the area of contact of the comestible with the freezing medium. When freezing comestibles in sealed packages by the so-called "belt-freezing" method, only two of the six sides of the package are in contact with a heat-abstracting surface. It is evident that if the packages were directly immersed in the brine, whereby there would be contact with all six sides of the package, that the package would be wet with the brine and thus be rendered entirely uncommercial. In accordance with my present invention, therefore, a non-wetting non-aqueous freezing medium is employed, the packages of comestibles, after proper sealing, being immersed in this liquid.

The most suitable liquid for the purpose is ordinary mercury. This heavy metallic liquid is an excellent conductor of heat, although it has a lower specific heat than water. It is much heavier than water, having a specific gravity of 13.596, and has the great advantage of forming a negative meniscus when in contact with surfaces that it does not wet. Now practically every non-metallic packing material, as well as even the comestibles themselves, are not wetted by mercury, hence, when a package of comestibles is plunged into mercury it will not be wetted thereby.

Mercury is liquid at temperatures as low as about −38° C. (practically also −38° F.), and hence can be cooled to nearly that temperature without congealing. Articles plunged into or submerged in such cold mercury will freeze with great rapidity, as the mercury, being a good conductor of heat, abstracts the heat from the articles speedily. As the mercury is liquid, it will make a perfect contact with the articles or packages, irrespective of their shape. The great weight of the mercury also further serves as a means of compacting the articles to be frozen, particularly when the same are in packages, whereby close contact of the individual articles is secured, leaving a minimum of air spaces between them. This is a very great advantage, and one of the outstanding features of the present invention.

If the package is rectangular, contact with all six sides of it is assured, the heat being abstracted in the direct ratio of the area subjected to refrigeration, and the temperature gradient between the cold mercury and the package or article. If the article is of irregular shape, the advantage is still maintained, as the mercury will make good contact with it on all of its exposed surfaces.

A simple method of carrying out the present invention is illustrated in Fig. 3, in which a container 6 containing brine 7 is provided. This brine is cooled by the usual type of direct-expansion type of refrigerant, such as by the cooling pipes 8, although of course the brine may be cooled by any suitable means and pumped into the container 6. Within the container 6 there is a second container 9 which is partly filled with mercury 10. The container, particularly the inner one, should be made of metal. The outer container can be of wood or non-metallic material, and in any event should be heavily lagged to prevent access of heat thereto. The inner container is provided with a cover 11 which may tightly close the container, and if desired a gasket 12 may be used to insure a tight joint between the container and the cover. However, the cover may be omitted if means be provided to insure the submergence of the article to be frozen under the mercury. Such a device may consist of a hinged perforated plate 13 fastened to the cover 11, whereby the article 14 to be frozen is pushed under the surface of the mercury.

In order to insure a uniform distribution of the heat absorbing brine 7, suitable propelling mechanism 15 may be provided.

The time of freezing is, of course, a factor involving the size of the article and the temperature of the mercury at the suggested temperature for carrying out the freezing in the device shown in Fig. 3, for example, a package of fish fillets will be from 25–35 minutes as against from 3½ to 5 hours for ordinary air-freezing methods.

If it is desired to carry out the freezing of packaged comestibles in a continuous manner, a machine such as shown in Figs. 1 and 2 may advantageously be employed. It should of course be understood that such a machine is, of course, only shown diagrammatically and the said drawings are not to be considered as actual working drawings, but merely represent the machine in sufficient detail so that its operations and functions may properly be understood by those skilled in the art.

The fundamental principle involved in the operation shown in Fig. 1, which is also true of the machine in Fig. 4, is the abstraction of heat from the articles to be frozen by placing the same in as close contact as possible with a good heat-conducting, non-wetting, very cold liquid such as mercury.

As diagrammatically shown in Figs. 1 and 2, the machine consists of a tank or container 16 containing cold brine 17, the said brine being cooled, if desired, by means of expansion pipes 18, although, of course, cooling of the brine may take place outside of the apparatus and the brine may be circulated through the tank 16. Arranged within the tank 16 is a smaller tank 19 which contains a shallow layer of mercury 20. Inasmuch as this layer will be quite heavy, suitable metallic reinforcing columns 21 may be provided to prevent a collapse of the tank 19.

Running either partially or entirely immersed in the mercury layer and suitably guided over a number of sprocket wheels 22, there is a set of link chains 23 and 23'. These chains are cross-connected so that they will run at the same speed and are provided with a plurality of propelling fingers or prongs 24, the said prongs being of such length as to reach almost to the bottom of tank 19. Suitable driving mechanism 25, as for example, belts and pulleys, are provided to actuate the belts 23 and 23'.

As will be seen from Fig. 1, packages 26 of comestibles are fed into the left side of the machine and by the slowly advancing fingers 24 attached to the belt 23 and 23' are propelled into the tank 19 and hence through the therein contained cooled mercury bath 20.

This mercury, which is cooled by the brine 17, is preferably kept at a temperature of about minus 30° F., which is about 8° above the congealing point of the said metallic liquid. As the packages, being much lighter than the mercury, tend to float, they are kept submerged in mercury by cross-bars 27 that are attached to the two belts 23 and 23' and extend transversely of the tank 19.

Packages of different sizes and different shapes, provided only that they are not too large to pass through the space between the belts 23 and 23' and the bottom of the tank 19, may be fed through the apparatus; and by the reason of the fact that the mercury is a liquid and hence will contact with every portion of the packages, it will extract heat therefrom uniformly and rapidly.

When freezing fish fillets, they should be packed in cardboard containers or their equivalent and the said containers tightly sealed to prevent access of mercury. The fillets should be packed tightly, with a minimum of air space between them, so that they will make good thermal contact with each other, whereby the speed of their freezing will be increased because of the more rapid conduction of the heat from the fillets to the outside of the packages. It is also advisable to make the packages into oblong shapes, relatively flat and wide rather than cubical or nearly so. As the packages consisting of cardboard or paper, and which may or may not be additionally covered with a wrapping of transparent reverted cellulose tissue, are not wetted by mercury, they will emerge at the right side of the apparatus shown in Fig. 1, perfectly dry but intensely cold and frozen. The fillets or other contents of the packages should be so packed that the resultant freezing will not unduly crush the contents by the expansion caused by the freezing.

The length of the machine and the speed of its operation are so adjusted that sufficient time is given for the complete freezing of the articles therein. It will, of course, be strictly within the scope of the present invention to fill the machine with a number of packages and then to stop it until they have been frozen and then to set the belts in motion to eject the frozen packages, while at the same time feeding in a new set of unfrozen packages.

In order to insure the thorough circulation of the brine, a propeller 35 may be provided. A slight modification of the machine is shown in Fig. 4, this being particularly suitable for freezing individual or a plurality of comestibles that are not wrapped in packages. Similar parts of the machine shown in Figs. 3 and 4 have been designated by the same numbers. However, in the machine shown in Fig. 4, a solid belt 23a replaces the link belts 23 and 23' of Fig. 1. Fastened to said belt 23a there are a plurality of propelling fingers 24a which preferably are riveted to the belt or welded thereto, there being, of course, a plurality of the said fingers across the belt somewhat after the fashion of a rake.

The articles to be frozen, in order to prevent contact with mercury therewith, are placed in a flexible mercury-proof sac or container 40, shown in Fig. 5. This container may be made of vulcanized soft rubber or of impermeabilized fabric, as, for example, canvas or heavy duck, which have been impregnated with rubber, cellulose esters, or other flexible impermeable substances.

The goods, for example, small fish, fillets, chops or steaks, are placed in the container 40, which, of course, is made seamless and the end thereof is then folded over double and tightly secured by the clamp 41, thus providing a sanitary mercury-proof package which, by reason of its flexibility, and under the influence of the pressure of the heavy mercury, will conform to the shape of the articles being frozen, thereby assuring the best possible contact with the heat-extracting medium. In order to insure the proper submergence of the belt and packages, rolls 42 are provided.

The two machines shown in Figs. 1 and 4 are really the same in principle, forming several exemplifications of the methods of carrying out the present invention. In the machine shown in Fig. 4, rolls 22a replace the sprocket wheels 22 shown in Fig. 1. It is to be understood that the level of the mercury 20 need not necessarily reach the belt 23a, as the displacement of the packages will of course raise the level of the mercury; hence only a comparatively small amount of mercury is needed to carry out the invention. Inasmuch as the belt 23a will naturally also become very cold, this belt also will serve as a cooling medium for the top of the packages while the mercury itself cools the other five sides of the packages.

Applicant is aware of the fact that flexible containers for freezing have been proposed in the past and have been immersed directly in cold brine. However, mercury is so much heavier and will exert, therefore, a much greater pressure when the packages are plunged under the mercury, so that the package covering will be collapsed against the contents thereof, and hence much better contact with the heat-extracting medium will be secured.

The resilient packages emerge from the right hand side of the machine, from where they may be shipped as they are or may be opened, given a short dip in warm water and the frozen contents removed, the empty packages then being ready to be returned to the feed-end of the machine in any suitable manner.

The propelling fingers 24a and the belt 23a may serve this function of returning the empty packages 40 to the feed side of the machine. It is, of course, to be understood that the entire machines, of any modification, are of course housed in suitable housings, properly lagged to prevent undue access of heat thereto, other mechanical appurtenances and adjustments to secure proper means for driving the machines being, of course, included; but, being all standard and well-known in the mechanical arts, are not illustrated or described.

While mercury has been mentioned as the non-wetting metallic heat-extracting medium, equivalent liquid alloys having a low enough melting point could, of course, be used, such as ammonium amalgam. The mercury might also be substituted by an organic fluid such as alcohol, glycols and oils having a very low cold test. In this case, the method as shown in Fig. 4 is best adapted because these liquids would otherwise wet the packages. If, however, the packages are placed within the bags 40, as shown in Figs. 4 and 5, this modification may be accomplished successfully.

Various mechanical equivalents for propelling the packages through the mercury, such as impelling the packages into the mercury at one end depending upon the introduction of subsequent packages to move the ones previously placed, are of course to be considered as a mere mechanical expedient.

While brine has been shown as a medium for cooling the mercury, it is of course obvious that the same might be cooled directly by suitable expanding refrigerants by passing the expansion pipes through the mercury, such means of refrigeration being also within the scope of the present invention.

What I claim and desire to protect by Letters Patent is:

1. The process of freezing comestibles which comprises wrapping the same and passing the wrapped products through a zone wherein they are subjected to heat-abstraction by means of a liquid metallic bath that does not wet the said wrapped products.

2. The process of freezing comestibles which comprises continuously advancing the same through a zone of refrigerated metallic liquid while wrapped in a wrapper not wettable by said liquid.

3. The process of freezing comestibles which comprises continuously advancing the same through a zone of refrigerated mercury while wrapped in a wrapper not wettable by said liquid.

4. A process of freezing comestibles which comprises the steps of wrapping them in a substantially liquid-tight wrapper non-wettable by mercury and continuously advancing the wrapped comestibles through a bath of liquid mercury maintained at a temperature substantially below zero degrees Fahrenheit.

5. A process of freezing comestibles which comprises the steps of wrapping them in a substantially liquid-tight wrapper non-wettable by mercury and continuously advancing the wrapped comestibles through a bath of liquid mercury maintained at a temperature substantially below minus 30° Fahrenheit.

6. The process of quick-freezing comestibles which comprises packing the same tightly and with a minimum of intervening airspaces into a container non-wettable by liquid metals, and thereupon passing the resulting packages through a zone wherein they are subjected to heat-abstraction by means of a liquid metallic bath.

7. The process of quick-freezing comestibles which comprises packing the same tightly and with a minimum of intervening airspaces into a container non-wettable by mercury, and thereupon passing the resulting packages through a zone wherein they are subjected to heat-abstraction by means of a bath of mercury.

In witness whereof, I have hereunto subscribed my name.

CARL MARX.